United States Patent [19]

Tianello et al.

[11] Patent Number: 5,363,156
[45] Date of Patent: Nov. 8, 1994

[54] FILM CARTRIDGE PROJECTION DEVICE

[75] Inventors: Dennis F. Tianello, Spencerport; John A. Romansky, Hilton, both of N.Y.

[73] Assignee: Eastman Kodak Company, Rochester, N.Y.

[21] Appl. No.: 171,800

[22] Filed: Dec. 22, 1993

[51] Int. Cl.$^5$ ............................................. G03B 21/00
[52] U.S. Cl. ............................ 353/26 R; 353/DIG. 2; 352/73
[58] Field of Search .................. 353/25, 26 R, 26 A, 353/DIG.2; 352/123, 73, 72, 74, 78 R

[56] References Cited

U.S. PATENT DOCUMENTS

| | | | |
|---|---|---|---|
| 3,383,156 | 5/1968 | Fried et al. | 352/123 |
| 3,508,818 | 4/1970 | Fried et al. | 352/123 |
| 3,550,879 | 12/1970 | Bundschuh et al. | 242/192 |
| 3,702,727 | 11/1972 | Kremp et al. | 352/123 |
| 3,771,859 | 11/1973 | Anderson | 352/123 |
| 3,992,088 | 11/1976 | Blanke | 353/26 R |
| 4,273,427 | 6/1981 | Bailey | 353/27 A |
| 4,353,642 | 10/1982 | Weigert | 353/25 |
| 4,746,209 | 5/1988 | Corrado | 353/25 |

FOREIGN PATENT DOCUMENTS

3002743  1/1991  Japan .................. 353/25

Primary Examiner—William A. Cuchlinski, Jr
Assistant Examiner—William C. Dowling
Attorney, Agent, or Firm—Peter J. Bilinski

[57] ABSTRACT

A projector having illumination and optical devices for projecting one or more images having a rotating magazine having a plurality of pockets disposed about its periphery for holding multiple slide film cartridges. The pockets loosely retain and orient the cartridges within the magazine in a manner such that a film strip contained therein can be advanced across a film gate between the illumination and optical devices once the magazine has rotated the pocket containing the cartridge to a projecting station.

21 Claims, 4 Drawing Sheets

FILM CARTRIDGE PROJECTION DEVICE

CROSS REFERENCE TO RELATED APPLICATIONS

Reference is made to commonly assigned copending patent application: U.S. application Ser. No. 08/172,013 entitled: "A Film Cartridge Magazine For Use In Photofinishing" filed concurrently in the names of Dennis F. Tianello, Alfanso Ianni and John A. Romansky and which is incorporated by reference herewith.

FIELD OF THE INVENTION

The invention relates generally to the field of photography and particularly to a photographic slide projection device.

BACKGROUND OF THE INVENTION

Most photographs are produced by exposing a film to light and developing the film to produce either a negative or a positive. The negatives can be processed (printed) to produce a photographic print, which may be directly viewed. The positives on the other hand are typically mounted onto slide mounts. The slide mounts or slides are fed into a carousel type magazine or an inline canister type magazine slide projector for successive viewing.

In a slide projector, successive slides which are contained in a magazine or canister are individually sequenced between an illumination source and an optical device. The illumination source focuses light onto the slide. The optical device then projects the image of the slide onto a viewing surface, such as a projection screen.

Current carousel type magazine such as those manufactured by the Eastman Kodak Company under the tradename of Carousel or inline type projection systems, are capable of storing approximately 80 slide mounts at one time.

PROBLEMS TO BE SOLVED BY THE INVENTION

Problems occur when slides are developed from one or more rolls of film and are individually placed in the same magazine or in different magazines or canisters. Some of the slides may be lost, placed in the magazine or canister in an improper order or may be oriented in an improper viewing direction meaning that a user viewing the slides may have the slides sequenced out of order or oriented improperly.

In addition, having to place slides in different magazines or canisters requires the user to interrupt viewing by either reloading a new magazine or removing and replacing slides within the current magazine or canister.

Another disadvantage is that when the positives are mounted on separate slide mounts, the positives are susceptible to scratching, being damaged by sharp objects and contamination from dust, dirt and/or fingerprints. The slide mount does not provide a damage-free environment for the positive slides. The various forms of positive damage mentioned above can reduce the quality of the projected image from the positive slide.

An additional disadvantage is that it is time consuming and expensive to place positives in slide mounts.

SUMMARY OF THE INVENTION

The present invention overcomes the disadvantages of the prior art by providing a projector that is capable of projecting images that appear on a slide film strip that is contained within a cartridge.

The foregoing is accomplished by a projector having illumination and optical sources for projecting an image, wherein the projector also comprises a magazine which is rotatably mounted to the projector, the magazine having a plurality of pockets disposed about its periphery in which each of said pockets are configured to retain a slide film cartridge for delivery of the film strip contained within the cartridge to a predetermined projection location; and means for advancing the filmstrip from a film cartridge retained in a pocket of the magazine to the projection location.

ADVANTAGEOUS EFFECTS OF THE INVENTION

An advantageous aspect of the present invention is that the images appearing on the slide film strip are always oriented in the way the photographer captured them, as well as in the sequence in which the photographs were taken.

Another advantageous aspect of the present invention is all of the images retained on a slide film strip will be kept together for projecting.

Another advantageous aspect of the present invention is that the images appearing on the slide film strip do not have to be individually mounted on slide mounts. All that is required is to load the slide film cartridges into a magazine.

An additional advantageous aspect of the present invention is that the slide film strip is protected from damage and contamination by being contained in a cartridge as opposed to individual slide mounts.

Still another advantageous aspect of the present invention is that the apparatus defining this invention is capable of storing approximately seven to ten times the amount of images which can be stored in a magazine found in prior art projectors.

DESCRIPTION OF THE PREFERRED EMBODIMENTS

Figure 1:
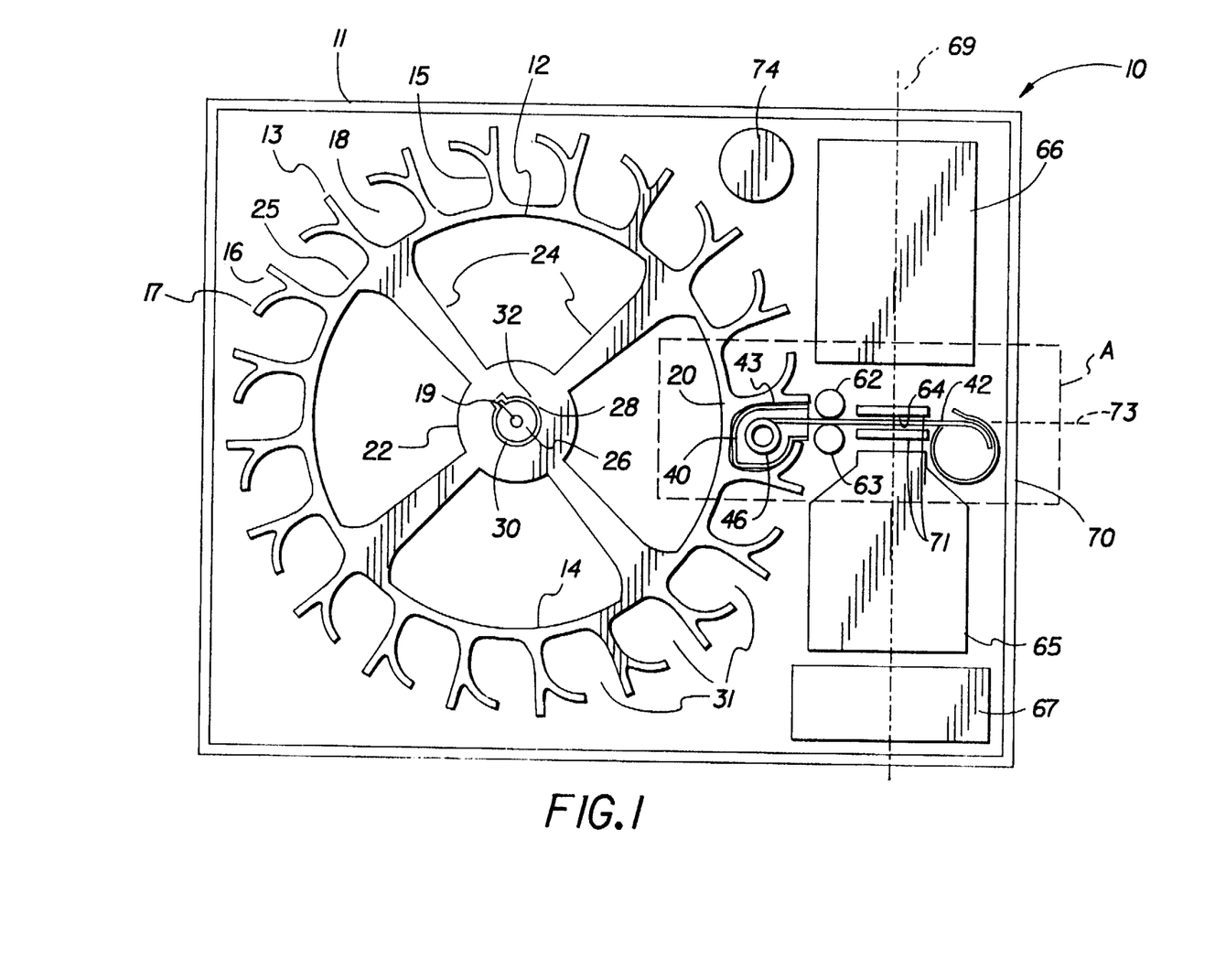
FIG. 1 is a top view of the apparatus, shown partially in section, according to a first preferred embodiment according to the present invention.

Referring now to the drawings in detail, and more particularly to FIG. 1, a projector 10 is shown having a housing 11 that contains the apparatus of this invention. A magazine 12 is provided, preferably having a circular configuration defining an inner peripheral wall 14 having a plurality of radially extending wall members 15, defining a plurality of preferably equally spaced pockets 18 about outer periphery 16.

Magazine 12 is rotatably attachable to housing 11, preferably to allow rotation about a central rotational axis 19, so as to sequence each pocket 18 in a step-wise fashion to a predetermined projection location 20, at projecting station —A—, (as shown by dashed lines), the details of which are described below.

According to this embodiment, magazine 12 is defined by a central hub section 22, the center of which coincides with rotational axis 19. A plurality of spoke-like members 24 extend radially from hub support 22 to inner peripheral wall 14. A shaft 26 having a key 28 extends longitudinally through an opening 30 defined in hub section 22, as well as through a similar opening (not shown) defined in housing 11. A stepper motor (not shown) rotates shaft 26, which is coupled to magazine 12 by key 28 and keyway 32, to allow rotational movement of magazine 12 about axis 19.

Figure 2:
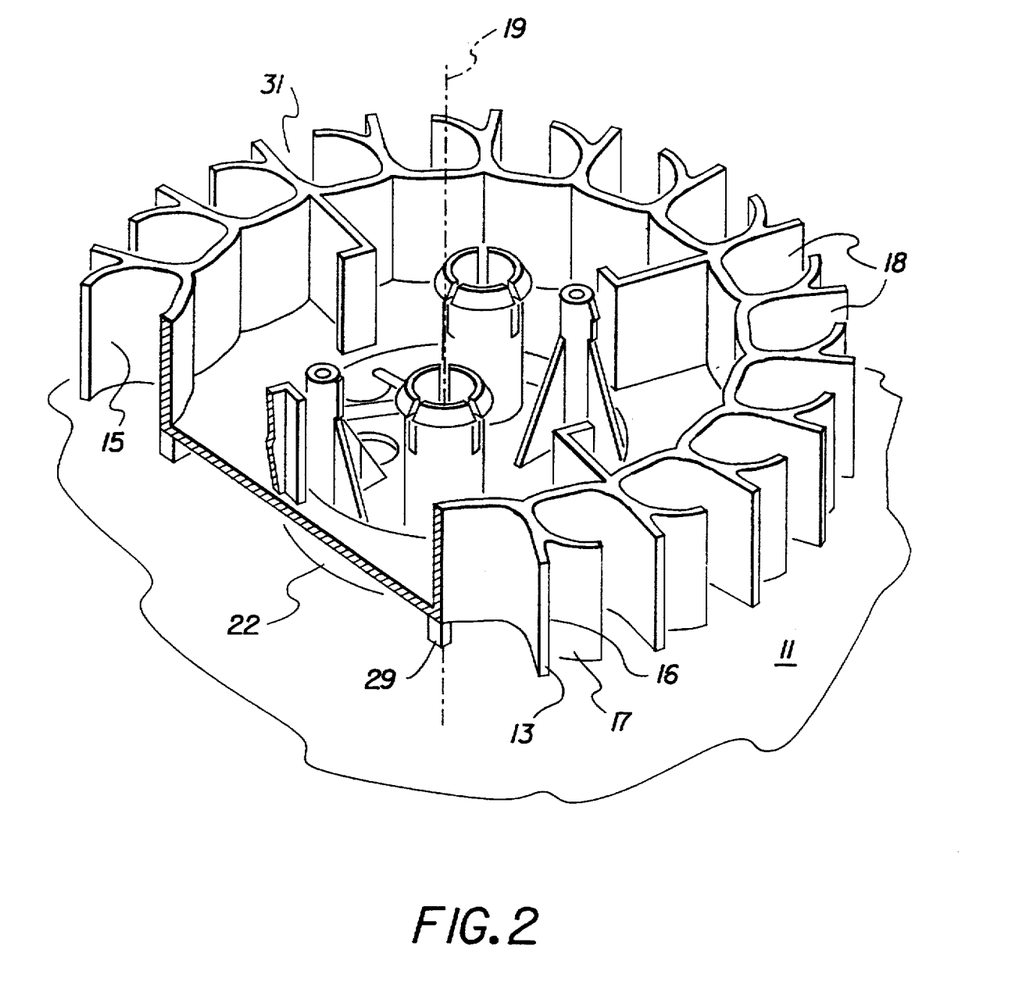
FIG. 2 is a partial cross sectional isometric view of a second embodiment of the magazine shown in FIG. 1 according to the present invention.

An alternative hub configuration is depicted in FIG. 2. Details pertaining to the structure of this particular embodiment are described in commonly assigned co-pending U.S. application Ser. No. entitled: "A Film Cartridge for Use in Photofinishing" by Dennis E. Tianello, Alfanso Ianni and John A. Romansky, which is hereby incorporated by reference.

It should be readily apparent that other techniques for rotatably mounting magazine 12 to housing 11 can be easily imagined. For example, the thickness of magazine 12 could be extended by including a plurality of tab members, 29 such as shown in FIG. 2. Tab members 29 can then be fitted within a narrowly defined ring (not shown) extending from a top surface of housing 11 and which is rotatably mounted thereto. By making this ring rotatable, the need for an entire center or hub portion 22 of magazine 12 can be obviated and pockets 18 can be advanced.

In this particular embodiment, 20 pockets 18 are provided in magazine 12. It should be readily apparent that any convenient number of pockets 18 can be provided. Referring specifically to FIGS. 1 and 2, each of the radially extending wall members 15 have branches 16, 17 which define a series of adjacent pockets 18. Branches 16, 17 are constructed in such a manner so as to allow a cartridge 40 to be easily inserted or removed from a pocket 18. In the embodiment shown, branch 16 is bent inwardly toward inner peripheral wall 14 to generally conform to the curved shape of a cartridge 40.

Preferably, the overall interior space which is defined by each of the pockets 18 produces a loose fit with a mounted cartridge 40, the pocket providing a means for retaining and orienting the cartridge 40. An open portion 31 between branches 16, 17 is provided to accommodate the snout shaped end 41, FIG. 4, of a cartridge 40 and to facilitate film removal from the cartridge at location 20, as described in greater detail below. The pockets 18 can, however, be made from a flexible material and defined so that the pocket 18 produces a slight interference fit with the cartridge 40. Alternatively, if a loose fitting pocket configuration is utilized, then cover plates (not shown) or other retention means having adequate accessing for removal and insertion of cartridges 40 would be required, particularly when a magazine 12 is being mounted to or from the projector or other location to prevent cartridges from spilling.

In a preferred embodiment, slight draft angles of approximately 2 degrees can be defined between branch 17 and corresponding wall member 15, as well as between wall member 15 and outer portion 25 of inner peripheral wall 14. Draft angles are not essentially required for the mounting of cartridges in a magazine for projecting, but can be added for convenience, especially for magazines 12 which can be vertically nested.

Each pocket 18 is configured to retain an individual film cartridge 40 in a specific orientation. The insertion and removal of cartridge 40 is preferably performed in a direction which is substantially parallel to central rotational axis 19.

Figures 3, 4:
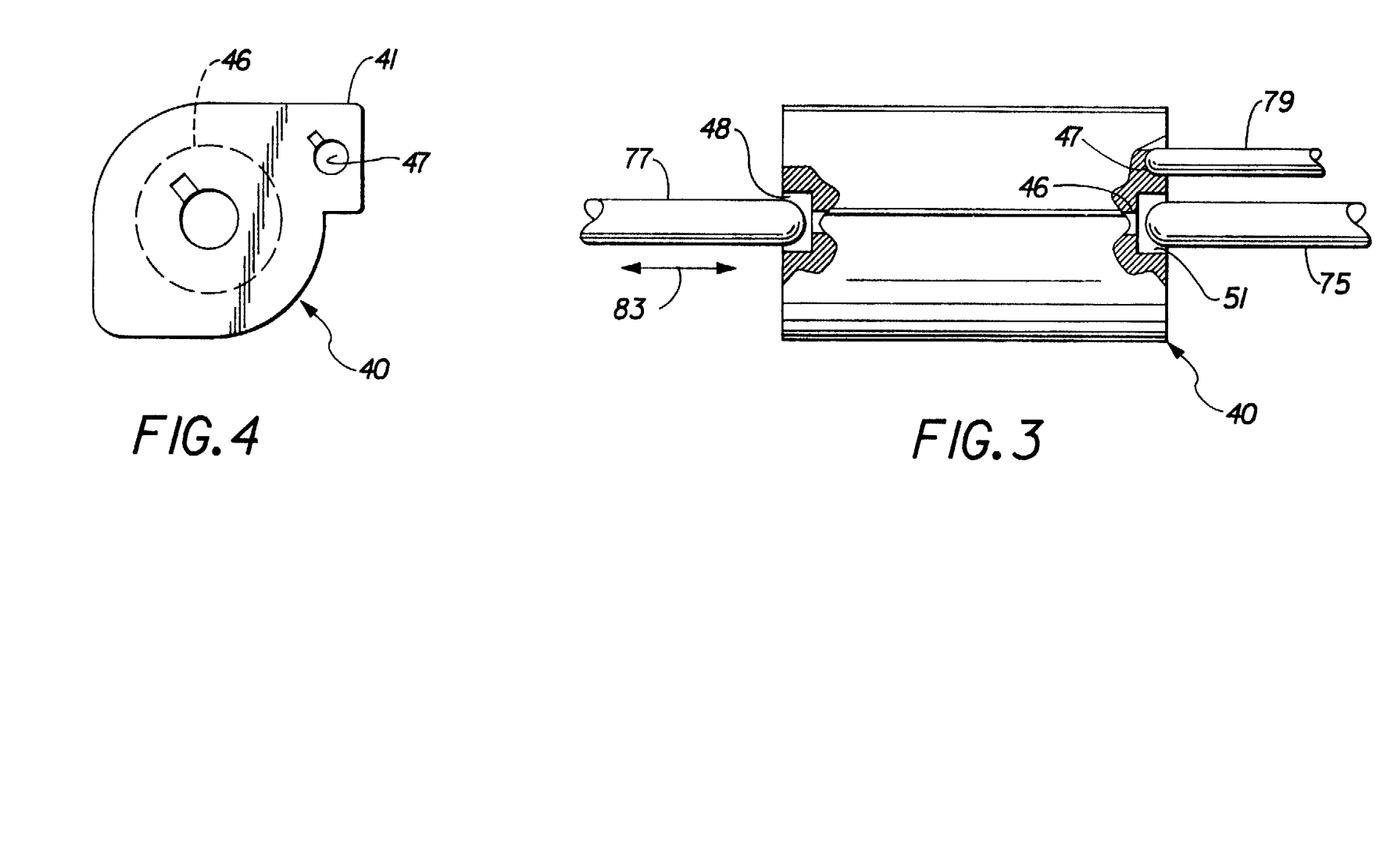
FIG. 3 is a partially exploded side view of a cartridge as used in the apparatus shown in FIG. 1.
FIG. 4 is a partial top view of the cartridge shown in FIGS. 1 and 3.

A typical film carrying cartridge 40, useful in the rotating magazine of the present invention is now described in detail by referring to FIGS. 1, 3 and 4. Cartridge 40 has a structure defined by an exterior shell portion 43, having a snout shaped end 41 and an interior spool 46 rotatably mounted to exterior shell portion 43. A film strip 42, FIG. 1, is wound around spool 46, the film being made from a flexible material and typically having 12,24 or 36 frames or exposures. Cartridge 40 may optionally contain a door (not shown) at snout shaped end 41, which must be opened in order to allow film strip 42 contained therein to be thrust out. The door can be opened or closed by rotation of a tab contained within hole 47. Recesses 48, 51 are provided at either end of spool 46, on either side of cartridge 40 for engaging drive mechanisms as discussed in greater detail later herein.

A detailed description of projecting station —A— Referring again to FIG. 1, an upper film roller 62 and a lower film roller 63 are positioned adjacent a film gate 64 which is disposed between an illumination source 65 and an optical system 66. Film drive rollers 62 and 63 meter the amount of film on film strip 42 which is removed from the snout shaped end 41 of a cartridge 40. A festoon chamber 70 is disposed oppositely from rollers 62, 63, relative to film gate 64, for receiving film 42 which has passed from cartridge 40 and past film gate 64. Rollers 62 and 63 can be driven by a motor (not shown) as is conventionally known. Rollers 62, 63, film gate 64 and festoon chamber 70 together define a transport path 73 which film 42 follows upon removal from cartridge 40.

Illumination source 65 comprises a lamp (not shown) or other known light source. Optical system 66 includes at least one lens for focusing and magnifying the image positioned at film gate 64. In combination, illumination source 65 and optical system 66 allow an image to be projected along an optical axis 69. In addition, a set of guide rails 71 are provided on either side of film gate 64 to insure film 42 is maintained properly along transport path 73.

Film gate 64 defines the area of the image that is going to be projected. Thus, when the images on film strip 42 are going to be viewed, one image or frame of film strip 42 is positioned within film gate 64. As the images or frames on film strip 42 are successively driven through rollers 62, 63 and past film gate 64, the images or frames are illuminated by illumination source 65 and projected by optical system 66 along optical axis 69, to a viewing area (not shown). Cooling fan 67 is mounted in housing 11 and is used to dissipate the heat generated by illumination source 65. The height of a projected image across film gate 64 can be adjusted by an elevating jack 74 which is also attached to housing 11.

Figure 5:
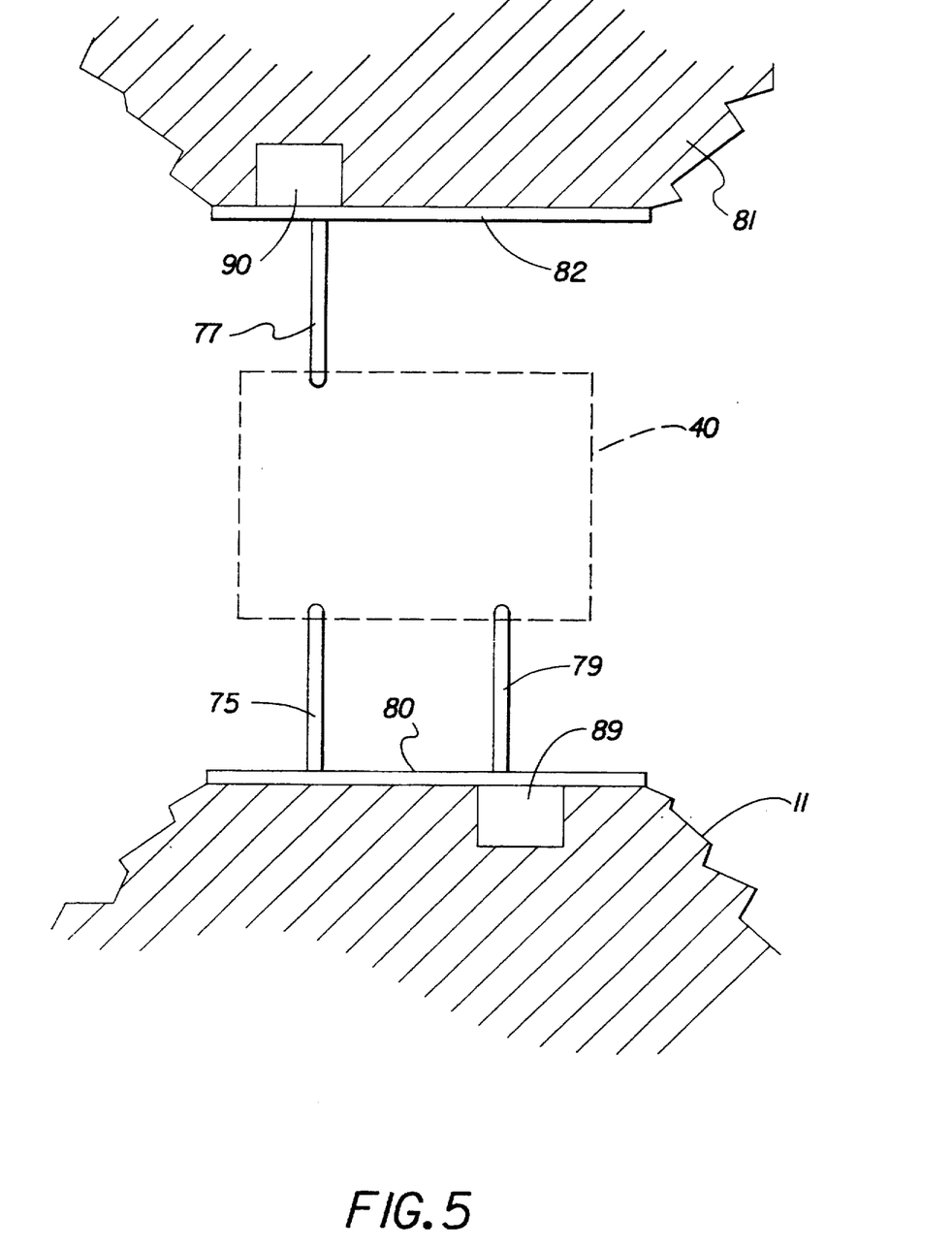
FIG. 5 is a partial side view of an engagement portion of the projector shown in FIGS. 1 and 3-4 for advancing film which is contained within a cartridge.

The mechanism for advancing film strip 42 from cartridge 40 will now be described. Referring to FIGS. 3-5, a fixed spool spindle 75 is attached at one end to a stationary plate 80, which is fixed to housing 11. A moving spool spindle 77 is connected to another stationary plate 82, similarly attached to a support 81 disposed above housing 11. Both plates 82, 80 are positioned at a location, relative to position 20, which is directly above and below a cartridge 40. This arrangement is shown in FIG. 5, with cartridge 40 being shown in phantom. Spindles 75 and 77 are coaxially arranged parallel to rotational axis 19 and are each sized for fitting within recesses 48, 51, respectively, of cartridge 40. In addition, a door-opening spindle 79 is also attached at one end to plate 80 for cartridges which utilize a door.

A drive mechanism (not shown) is connected to fixed spool spindle 75 to move spindle 75, as shown by arrow 83, FIG. 3, in a direction which is substantially parallel to rotational axis 19. Similarly, door-opening spindle 79 can also be driven by the same drive mechanism (not shown) so as to move in a direction as shown by arrow 83. In addition, a rotation device 89 as shown in FIG. 5 is provided for allowing spindle 79 to rotate about its longitudinal axis.

A second drive mechanism (not shown) and second rotation device 90 allows moving spool spindle 77 to reciprocate and rotate in a similar manner as spindle 79. Rotation devices 89 and 90 can be any conventionally known device which can impart a rotational force; such as a motor (not shown) which can be directly connected to a linkage arm,(also not shown)or other force transmitting element. Preferably, rotation device 90 allows moving spool spindle 77 to rotate in either a clockwise or counterclockwise direction to allow film to be advanced or rewound.

Magazine 12 is preferably constructed of a clear or transparent material, such as polycarbonate so that any matter, such as data relating to film speed, film type and the like, which may appear on cartridge 40 can be read, such as by an individual or by a machine (not shown).

In operation, and referring specifically to FIGS. 1-5, a cartridge 40 is placed in a pocket 18 of magazine 12 and is sequentially advanced to position 20, FIG. 1. Because the shape of pocket 18 substantially conforms to the geometry of a cartridge 40, there is only one preferred orientation for a cartridge to be fitted within the pocket 18. This orientation succeeds in placing cartridge 40 in an attitude wherein recesses 47, 48 and 51 are arranged substantially parallel to rotational axis 19. Pocket 18 also arranges snout shaped end 41 in a manner extending substantially radially outward from the center of rotation 19. This allows film strip 42 to be presented in a direction along transport path 73 when cartridge 40 is advanced to position 20. Sensors (not shown) can be positioned along a bottom portion of magazine 12 to detect whether pocket 18 is properly positioned at location 20.

Pocket 18 loosely retains a cartridge 40 but the retention is sufficient so that at location 20, that spindles 75, 77, 79 can easily engage recesses 47, 48 and 51. When cartridge 40 reaches position 20, spool 46, onto which film strip 42 is wound is coaxially located between moving spool spindle 77, FIG. 3, and fixed spool drive spindle 75, FIGS. 3 and 5. Moving spool spindle 77 and fixed drive spindle 75 then combine to thrust film 42 from spool 46 and out of snout shaped end 41. Moving spool spindle 77 moves vertically per arrow 83, FIG. 3, to engage cartridge 40 through holes 48. Upon engagement within hole 48, moving spool spindle 77 then rotates to thrust film strip 42 out of cartridge 40 and between film drive rollers 62 and 63, FIG. 1. At the same time of engagement, fixed spool drive spindle 75 and door opening spindle 79 are caused to engage cartridge holes 51 and 47, respectively. This provides the needed clamping action required to support cartridge 40 in order to advance film strip 42.

If a door is present, door opening spindle rotates to engage a tab which allows the door (not shown) to open and then moving spool spindle is permitted to rotate to drive the film 42 from cartridge 40. Door opening spindle 79 is therefore only utilized if a door is present in cartridge 40. Because the film 42 is to be projected frame by frame, the drive mechanism (not shown) is preferably a stepper motor to intermittently advance film 42 from spool 46 and out of cartridge 40.

Because of the constraining effect of pocket 18, and the clamping forces imparted to cartridge 40 by spindles 75 and 77 unwanted rotation of the cartridge is avoided and film strip 42 can be properly advanced along transport path 73.

Film drive rollers 62, 63, positioned adjacent snout shaped end 41, engage film strip 42 as it is advanced from cartridge 40. Film 42 is subsequently advanced between guide rails 71 and across film gate 64 where an image is projected. Film 42 which is subsequently passed through film gate 64 is advanced into festoon chamber 70 where it is retained. Preferably, detection of the location of the film 42 for insuring proper framing of the film in film gate 64 is provided by optical sensors, such as an emitter and a photosensor (not shown) which can be placed within the transport path 73.

After the viewing session for the images contained on a particular film strip 42 is complete, film drive rollers 62 and 63 cease to drive film strip 42 into festoon chamber 70, and the moving spool spindle 77 can be engaged to drive film strip 42 in the opposite direction so as to pull film 42 back into cartridge 40. At this juncture another cartridge 40 (not shown) can be incremented to position 20 by sequencing the drive means (not shown) so as to advance rotationally movable magazine 20.

It should be readily apparent, from the preceding discussion that festoon chamber 70 could be replaced with a take-up spool (not shown) having a motor drive such that film strip 42 could initially be advanced completely onto the take-up spool and then rewound frame by frame across film gate 64 and into cartridge 40.

The above specification describes a new and improved film cartridge projection device. It is realized that the above description may indicate to those skilled in the art additional ways in which the principals of this invention may be used without departing from the spirit. It is therefore, intended that this invention be limited only by the scope of the appended claims.

PARTS LIST projector 10
housing 11
magazine 12
outer periphery 13
inner peripheral wall 14
wall member 15
branch 16
branch 17
pocket 18
rotational axis 19
projection location 20
hub section 22
spoke-like members 24
outer portion of inner peripheral wall 25
shaft 26
key 28
tab members 29 opening 30
open portion 31
keyway 32
cartridge 40
snout shaped end 41
film strip 42
exterior shell 43
interior spool 46
door engagement recess 47
recess 48
recess 51
upper film roller 62
lower film roller 63
film gate 64
illumination source 65
optical system 66
cooling fan 67
festoon chamber 70
guide rails 71
transport path 73
elevator jack 74
fixed spool drive spindle 75
door opening spindle 77
moving spool spindle 79
stationary plate 80
support 81
plate 82
arrow 83
rotation device 89
rotation device 90

What is claimed is:

1. A projector having illumination and optical devices for projecting one or more images, is characterized by:
a magazine rotatably mounted to said projector, said magazine having a plurality of pockets disposed about its periphery, each of said pockets having a configuration for holding a film cartridge for delivery of a film strip contained within a said cartridge through a predetermined location for projecting an image of said film, said projector including means for conveying said film strip into and out of a held cartridge wherein said cartridge contains a spool for retaining film therein, said means for conveying said film strip including means for engaging said spool so as to thrust the film strip into or out of a said cartridge.

2. The projector as recited in claim 1, said cartridge further including a door, wherein said projector further includes:
means for opening said door to allow the film strip to exit and enter said cartridge.

3. The projector as recited in claim 1, wherein said means for conveying further comprises means for guiding the film strip into or out of a film gate positioned between said illumination and optical devices.

4. The projector as recited in claim 3 further comprising sensors for detecting the position of a film strip relative to said predetermined position.

5. The projector as recited in claim 3 further comprising a chamber for holding a film strip that has been advanced beyond the illumination and optical devices of said projector.

6. The projector as recited in claim 1 wherein at least a portion of said magazine is made from a clear material so that matter disposed on a said cartridge can be detected.

7. The projector as recited in claim 1, said magazine further comprising a peripheral wall having a generally circular configuration and having an inner and an outer surface, wherein said pockets comprise:
a series of wall members extending substantially radially outward from said inner surface of said peripheral wall;
a first and a second branch extending from said wall members, wherein said branches, said wall members and the inner surface of said inner peripheral wall define a series of spaced regions, each sized for retaining a film cartridge.

8. A projector having illumination and optical devices for projecting an image comprising
a magazine rotatably mounted to said projector, said magazine having a plurality of pockets disposed about its periphery, each of said pockets being configured to retain a film cartridge for delivery of a film strip contained within the cartridge to a predetermined projection location; and
means for advancing the film strip from a said film cartridge retained within a said pocket so that an image located in the film strip is positioned at the predetermined location wherein said cartridge includes a spool for retaining said film strip thereon, and said advancing means includes means for engaging said spool so as to thrust the film strip into and out of said cartridge.

9. A projector as recited in claim 8, further comprising a housing having a surface for supporting at least one said rotating magazine, wherein said magazine is releasably engageable with said support surface.

10. A projector as recited in claim 9, said magazine having a generally circular configuration, said magazine being centrally supported on said support surface and further defined by a rotational axis.

11. A projector as recited in claim 10, further comprising means for rotating said magazine about said rotational axis for delivery of a film cartridge to said film advancing means.

12. A projector as recited in claim 13, further comprising
means for rotating a supported magazine about said rotational axis for delivery of a thrustable film cartridge to said advancing means.

13. A projector as recited in claim 9, wherein said film advancing means comprises one or more spindles coupled to said projector, said one or more spindles being engageable with said cartridge to thrust at least a portion of said film strip out of said cartridge.

14. A projector as recited in claim 9, further including:
means for guiding the film strip from said cartridge across a film gate, said film gate being positioned between an illumination device and an optical system for projecting an image.

15. A projector as recited in claim 14, wherein said guiding means comprises at least one set of rollers for engaging the surface of said film strip, said rollers being positioned between said cartridge and said film gate.

16. A projector as recited in claim 15, further including a retaining chamber for holding film from said cartridge which has been advanced beyond said film gate.

17. A projector as recited in claim 16, further including means for rewinding the film strip from said retaining chamber and into said cartridge.

18. A projector having illumination and optical devices for projecting one or more images comprising:

a housing;

a magazine rotatably attached to said housing;

a plurality of pockets disposed about said magazine, each of said pockets having a configuration for retaining and orienting a film cartridge containing a flexible film strip containing a plurality of frames and a spool for retaining the film thereon;

one or more spindles coupled to said projector to engage said cartridge spool to thrust the film strip in an intermittent manner so as to advance the film contained therein out of said cartridge frame by frame;

one or more rollers for guiding the film strip of said cartridge into or out of a film gate located between the illumination and optical devices; and a chamber for retaining that portion of the film strip which has been advanced beyond said film gate.

19. A projector as claimed in claim 18, further comprising one or more sensors for sensing the location of the film strip, said sensors being disposed adjacent said film gate.

20. The projector as recited in claim 18, said magazine further comprising a peripheral wall having a generally circular configuration and having an inner and an outer surface, wherein said pockets comprise:

a series of wall members extending substantially radially outward from said inner surface of said peripheral wall; and a first and a second branch extending from said wall members, wherein said branches, said wall members and the inner surface of said peripheral wall define a series of spaced regions, each sized for retaining a film cartridge.

21. A projector as claimed in claim 18, wherein said magazine is made from a clear material so that matter appearing on the surface of a cartridge positioned within a pocket of said magazine may be read.

* * * * *

UNITED STATES PATENT AND TRADEMARK OFFICE
CERTIFICATE OF CORRECTION

PATENT NO. : 5,363,156
DATED : November 8, 1994
INVENTOR(S) : Dennis F. Tianello, et al It is certified that error appears in the above-indentified patent and that said Letters Patent is hereby corrected as shown below:

Column 8, line 41, delete "13" and insert --11--.

Signed and Sealed this

Fourteenth Day of March, 1995

Attest:

BRUCE LEHMAN

Attesting Officer     Commissioner of Patents and Trademarks